Figure 1:
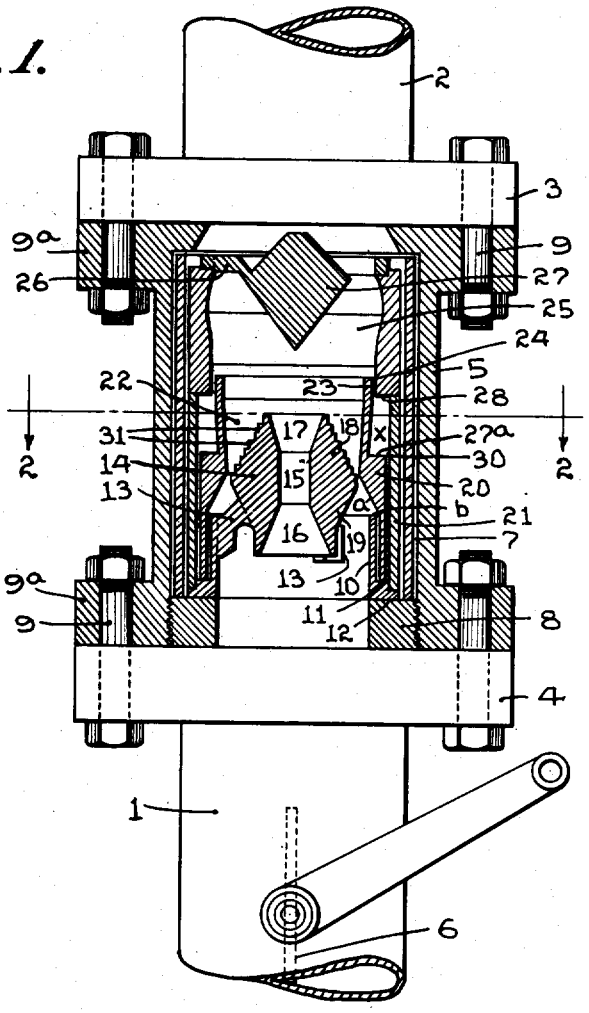

Oct. 7, 1924. Re. 15,926

F. POKORNY

FLUID CONTROL MEANS FOR MOTORS

Original Filed Nov. 17, 1919

Inventor
Frank Pokorny
By Frederick W. Barker,
Attorney

Reissued Oct. 7, 1924. Re. 15,926

UNITED STATES PATENT OFFICE.

FRANK POKORNY, OF MAMARONECK, NEW YORK, ASSIGNOR, BY DIRECT AND MESNE ASSIGNMENTS, OF ONE-HALF TO FRANCIS W. KEEGAN, OF NEW YORK, N. Y.

FLUID-CONTROL MEANS FOR MOTORS.

Original No. 1,361,180, dated December 7, 1920, Serial No. 338,747, filed November 17, 1919. Application for reissue filed December 7, 1923. Serial No. 605,527.

*To all whom it may concern:*

Be it known that I, FRANK POKORNY, a citizen of the United States, and resident of Mamaroneck, in the county of Westchester, in the State of New York, have invented certain new and useful Improvements in Fluid-Control Means for Motors, of which the following is a specification.

This invention relates to internal combustion engines and my improvement is directed to means for automatically controlling the supply of fuel proportionately to the requirements of the engine with relation to its R. P. M. rate, in order that neither more nor less fuel may be admitted to the intake manifold than will satisfy the efficient consumption needs of the engine in all its speed variations.

The difficulty lies in the fact that it is almost impossible through human control means to so vary the adjustment of the throttle valve as to regulate the fuel supply in proportion to the variable number of piston strokes per minute, and without such regulation the flow of fuel mixture cannot accord with the precise engine requirements in all its speed variations. In consequence the engine will either be flooded with surplus fuel which it is unable to digest, or else the engine will be starved with too lean mixture.

Therefore my invention has been devised for the purpose of providing automatic means, actuated by the aspiratory tension of the engine, to control the fuel supply, so that at a low R. P. M. rate the volume of fuel mixture permitted to pass to the intake manifold is restricted, but when the engine speed has increased considerably the fuel mixture passage opens up commensurately for the delivery of satisfying charges, the increase in passage area progressing in synchronism with the pick up in motor speed.

But the automatic engine control comprising my invention will not permit the passage to the intake manifold of excess quotas of fuel mixture at any intermediate stage in the range of engine speeds, even though the throttle valve may have been opened wide upon starting up the engine, because the engine control will properly coordinate the fuel mixture supply to the engine speed.

Briefly expressed, my invention consists of means included in the passage from the carbureter to the intake manifold, to normally restrict the capacity of said passage so that at low engine speeds only a relatively small volume of fuel mixture may pass, the cross sectional area of the fuel mixture passage being governed by a gravity return valve which, during the initial portion of its opening movement is sluggish in operation, so that only a sufficient quantity of fuel mixture will be delivered, because on account of the sluggish movement of the valve it will only slightly increase the passage opening during the first or early portion of the engine speed range.

The gravity return valve operates through a so-called vacuum chamber whose rarefied condition increased as the valve advances in said chamber due to the fact that the opening to said chamber through which the suction pull of the engine is exercised enlarges more rapidly after the R. P. M. rate of the engine has entered upon a higher portion of its speed range, and then, for the higher engine speeds the cross sectional area of the fuel mixture passage increases more rapidly, thus permitting the flow to the intake manifold of the greater, or satisfying fuel mixture charges. The passage control, referred to is a function of the engine tension which varies according to the speed at which the engine operates; hence this control is purely engine control and automatic in its operation.

Of course, it is to be understood that the speed of the engine may, with my invention applied, be controlled as before by the usual throttle valve, but the speed of the engine will in turn serve to control the quantity of fuel mixture that is admitted thereto. Whereas, without the use of my fluid control means, the effect of suddenly opening the throttle wide, as under a heavy load or on a steep up-grade, would be to cause the engine to clean out from the manifold all the available fuel, resulting in a sharp, momentary pick up in engine speed, and then, before the carburetor has had time to function according to the change in engine speed, the engine will "cough" and "knock" because the succeeding mixture will be too lean to supply power charges capable of sustaining the momentum induced by the first, but unsupported quota of excess fuel charge.

With the fluid control means installed, however, the increasing volume of fuel mixture supply to the engine will be graduated to and by the progressive increase in engine speed, whether the throttle be "slammed" wide open by an inexperienced operator, or skillfully opened step-by-step in approved manner.

Other features and advantages of my invention will hereinafter appear.

In the drawing:—

Figure 2:
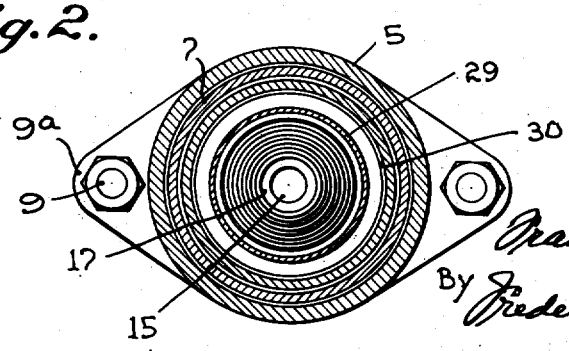

Figure 1 is a vertical sectional view of a fuel mixture passage embodying my improvement, and Fig. 2 is a cross-section on the line 2—2 of Fig. 1.

In the drawing, let 1 indicate a tube which is in communication with a carburetor (not shown), and let 2 indicate a tube which communicates with or forms part of an engine intake manifold. The tubes 1 and 2 are connected, as by flanges, 3, 4, by means of an intermediary, cylindrical casing, 5, which serves as a duct or passage for the fuel mixture flowing to the engine.

In tube 1 I have shown a throttle valve 6, which however may be otherwise located. I have also shown a sleeve 7 as constituting an interior lining for casing 5. This is for structural convenience, in that by this means the elements of the control means to be hereinafter described, may be snugly contained within said sleeve, which latter is secured within the casing 5, that may be a casting, as by a threaded annulus 8 that is screwed into the lower end of the casing 5, the annulus 8 itself forming a supporting base for said elements.

In this manner, by removing the bolts 9 that unite flanges 3, 4 with the flanges 9ª of casing 5, the latter, with the contained control elements, may be bodily removed from its line position.

Fitting within the lower portion of sleeve 7, to lie imposed upon annulus 8, is a concentric, tubular member 10, which is here shown as having the external annular steps or shoulders 11, 12, and is provided interiorly with the centering arms 13 that carry a centrally disposed nozzle or passage member 14, which is provided with an axial orifice 15. Said orifice 15, which comprises the restricted passage for the flow of fuel mixture whereby the engine may be operated at its idling or low speed, is represented as having an outwardly flared inlet 16 and an outwardly flared exit 17, the intermediate portion of said orifice being in cylindrical form.

The external form of member 14 is that of a double cone, having the upper conical portion 18 and the lower, inverted conical portion 19, the junction of said conical portions representing the major diameter of the member 14, whose periphery, in the horizontal plane of said major diameter co-acts with a tubular valve member 20 for the passage of regulated supplementary quotas of fuel mixture in a manner to be hereinafter described.

The tubular valve member 20, which may be termed a gravity return piston, is vertically operable within a concentric housing 21, and at its lower portion said valve member is in slidable contact with said housing. The thickness of wall of said valve member enables it to occupy the concentric space between the nozzle 14 at the major diameter thereof and the inner surface of housing 21 when said valve member 20 is in its normal or lowermost position, to thus close the passage represented by said concentric space, but when said member 20 is moved upwardly, then an opening is provided of varying extent, according to the height to which said member 20 is lifted, for the passage of further quotas of fuel mixture. The lowermost portion of member 20 is like a cylindrical apron which lies between the tubular member 10 and housing 21 and seats upon the step or shoulder 11 on tubular member 10 in its normal position. The interior wall member 20, between its most restricted portion and its apron like portion, is of conoidal form, to present a convergent surface to the ascending fuel mixture, whereas the inverted conoidal surface 19 of member 14, which is opposed thereto, has the tendency to outwardly deflect the passing fuel mixture, the intersecting currents of fuel mixture thus established assisting in the intermingling action of the elements comprising said mixture. This effect it will be understood is particularly advantageous when the member 20 is lifted to provide a passage between it and member 14.

The member 20, at its upper portion, above the horizontal plane of its most restricted cross-sectional area, is in the form of an outwardly flared circular apron 22, which terminates in a short cylindrical portion 23, that lies normally within the lower, cylindrical surface portion 24 of an annular member 25, in concentric relation therewith, a slight clearance only separating said portions 23, 24.

Above said lower portion 24 of member 25 the inner surface of the latter expands slightly in the upward direction to a point near the upper end of said member 25, thence inclining inwardly; and, at its upper end the member 25 has the centering arms 26 which support a centrally disposed conoidal member 27, which, lying as it does in the axial path of the ascending fuel mixture, again deflects the cross currents thereof in their passage to the intake manifold.

An essential feature of the invention consists in the provision of what I term a vacuum chamber $x$, which is bounded vertically between the opposed surfaces of shoulders 27ª, 28 respectively upon the valve member 20 and the annular member 25, and concentrically by the outer surface 29 of member 20, and the inner surface 30 of housing 21, said chamber contracting vertically with the upward movement of member 20.

In practice, it is the suction pull of the engine that, operating through the clearance between portions 23, 24, tends to exhaust the vacuum chamber, but because that clearance is slight the degree of engine tension at low R. P. M. rate is insufficient to raise member 20 over more than a small extent, and therefore member 20 fails to open the passage between it and member 14 more than slightly, so that very little additional fuel mixture is passed to the engine in excess of the volume that passes through orifice 15 during this initial range of movement of member 20. In other words, the valve member 20 may be said to be relatively heavy to the suction pull of the engine in its range of movement represented by the distance the portion 23 travels to pass the portion 24. But when the portion 23 of valve member 20 has passed above the portion 24 of member 25, then the inclined valve portion represented by apron 22 enters into opposition with the expanded portion of member 25, thereby considerably increasing the clearance through which the suction pull of the engine operates to evacuate the vacuum chamber, so that the valve 20 becomes lighter as it were; or, more readily responsive to the increased tension of the motor at the greater R. P. M. rate at which the motor must operate in order to draw said valve upwardly to a point where the clearance begins to expand.

Obviously, while the fuel mixture passage between member 14 and valve 20 opens up only slowly under the sluggish or weight retarded travel of said valve during the travel range in which portion 23 is passing portion 24, which will be during the relatively low speed R. P. M. rate of the engine, a different condition will exist with a relatively high speed R. P. M. rate under the more quickly responsive operation of the valve 20, which enlarges said fuel mixture passage aforesaid proportionately to the engine needs and enables satisfying fuel mixture charges to pass to the intake manifold.

While lift to the valve 20 is, at all times during the motor operation, imparted by upward suction pull applied to vacuum chamber $x$, plus impinging pressure against the inclined surface $a$ of said valve, also a lift retarding influence or downward pull is exerted through suction induced by the vacuum created between the lower end of valve 20 and its seat 11, this suction influence, as opposed to the upward suction pull, becoming less effective as the clearance between apron 22 and the expanded portion of member 25 increases, so that the valve 20 is subjected to opposing lift and drag forces wherein the drag is more pronounced (though always preponderated by the lift force) in the first portion of the valve's upward or opening movement, until, as previously stated, the clearance between apron 22 and the expanded portion of member 25 increases so that the relatively larger area of surface $27^a$, thus rendered more fully exposed to the upward suction influence, plus the diminishing volumetric capacity of chamber $x$, permits progressive acceleration in the upward or opening movement of valve 20 as soon as the valve portion 23 has passed the cylindrical portion 24 of member 25.

It is important to note that the vacuum chamber $x$ is in communication through the space between the parts 20 and 30, with the suction or drag chamber formed between the lower end of the valve 20 and its seat 11, whereby the vacuum in the chamber $x$ continuously acts upon the suction drag chamber during the upward movement of the member 20.

An important operative feature inherent to the use of my improved fluid control means is the continuity of fluid flow to and in the intake manifold insured thereby under all variations of engine speed and notwithstanding the throttle valve may be inexpertly manipulated. This is due to the condition provided wherein the increase in engine speed concomitantly creates a proportionately increased area for the fluid passageway, so that the suction pull exerted by the engine is at all times and in all degrees of its variable tension capable of maintaining the fluid flow in unbroken column, though that column be variable in volume. For example, when the valve 20 is in its lowermost position the concentric fluid passage between said valve and member 14 is most closely restricted, and consequently the fluid flow at the then low rate of engine speed will be in small volume but at relatively high velocity. Assuming the throttle valve to be suitably opened the tendency of the engine will be to progressively increase in speed up to its maximum rate, it, continually with its advancing speed,—a lead being maintained—and therefore with the greater suction force it exerts, raising the valve to enlarge the fluid passage, and at each step in progression, exerting the needful tension whereby the varying volume of fluid is maintained in unbroken column.

Also, it will be noted in the operation of the specific fluid control device illustrated, wherein a central flow of fuel mixture is provided for and also a concentric flow of fuel mixture in variable volume, that while the central fluid flow is caused, by the flared nozzle portion 17 and the deflecting member 27, to take a divergent upward path, the outer, concentric fluid flow is convergingly directed by valve surface $a$, and thus caused to impinge upon the central flow of fluid, so that a fuel pulverizing effect is produced, and the fuel mixture as a whole becomes more thoroughly blended and capable of more complete combustion.

As a further inventive feature the upper, conoidal portion 18 of member 14 is provided with steps 31, which are successively passed by the restricted portion of valve 20 in the operation of the latter, each step affording through its vertical extent a dwell area past which the volume of ascending fuel mixture will be constant until the valve restricted portion has moved into passage relation with a succeeding step, to either increase or diminish the fuel mixture passage according to whether said valve is rising or falling. By this means there is provided a further precaution against the delivery of too large a volume of fuel mixture for a particular engine speed, because the dwell period or extent gives the engine the opportunity to speed up to the point where it needs an increased fuel mixture supply before the volume thereof is enlarged.

Inversely, in the slowing down of the engine speed, the volume of fuel mixture admitted past these steps is correspondingly regulated.

It will be apparent that while the passage between member 14 and valve 20 is referred to herein as a fuel mixture passage for use in the particular example of my invention illustrated, it is susceptible of a wider range of usefulness in carburation and may be more broadly referred to in the claims as a fluid passage, to be inclusive of either air or fuel or mixtures thereof.

Also it will be obvious that the principle involved in my invention is applicable to fluid control for carburetors and engines in any desirable manner.

Variations within the spirit and scope of my invention are equally comprehended by the foregoing disclosure.

I claim:

1. The method of varying the volume of fluid supplied to an internal combustion engine having fluid control means, which consists in applying the tension created in the aspiratory operation of the engine as suction pull upon said control means, and in applying a drag force to said control means in opposition to said suction pull, with the suction pull preponderating during the lower range of engine speed, for sluggishly increasing the volume of fluid passing to the engine as the engine speed increases, and increasing in its preponderance through the higher engine speed ranges, to more rapidly increase the volume of fluid passing to the engine as the engine speed then rises at a higher progressive ratio.

2. The method of varying the volume of fluid supplied to an internal combustion engine having gravity return fluid control means, which consists in applying the tension created in the aspiratory operation of the engine as suction pull upon said control means, and in applying a drag force to said control means, supplemental to gravity, in opposition to said suction pull, with the suction pull preponderating for sluggishly increasing the volume of fluid passing to the engine as the engine speed increases.

3. The method of varying the volume of fluid supplied to an internal combustion engine having gravity return fluid control means, which consists in applying the tension created in the aspiratory operation of the engine as suction pull upon said control means, and in applying a drag force to said control means, supplemental to gravity, in opposition to said suction pull, with the suction pull preponderating during the lower range of engine speed for sluggishly increasing the volume of fluid passing to the engine as the engine speed increases, and increasing in its preponderance through the higher engine speed range, to more rapidly increase the volume of fluid passing to the engine as the engine speed then rises at a higher progressive ratio.

4. The method of proportioning the volume of fluid supplied to internal combustion engines which consists in varying the capacity of the fluid passage through the force created by the engine in its aspiratory operation, as opposed to gravity supplemented by a vacuum drag, and in causing said variation to be relatively small at low engine speeds, but enlarging with progressively increasing rapidity through higher engine speed ranges.

5. The method of proportioning the volume of fluid supplied to an internal combustion engine according to the speed of the of the engine which consists in varying the volumetric capacity of the fluid passage through the suction force created by the engine in its aspiratory operation, as opposed to gravity, and wherein a vacuum drag force is exerted oppositely to the suction force, to supplement gravity, through a given range of variation for the fluid passage capacity, said vacuum drag force becoming retrogressively of less relative effectiveness as the fluid passage capacity increases beyond its said low range of variation.

6. An internal combustion engine having control means operable through the suction pull created by the engine in its aspiratory operation to permit the supply flow of fluid to increase proportionately with the increase in engine speed, means for establishing a vacuum drag force, opposed to the suction pull, to retard the actuation of said control means through the low engine speed range, and means co-acting with said control means whereby the suction pull increases in its preponderance over the drag force to accelerate the actuation of said control means through the higher engine speed.

7. An internal combustion engine having gravity return fluid control means operable through the suction pull created by the engine in its aspiratory operation to permit the supply flow of fluid to increase proportionately with the increase in engine speed, means for establishing a vacuum drag force, supplemental to gravity, opposed to the suction pull, to retard the actuation of said control means through the low engine speed range, and means co-acting with said control means, whereby the suction pull increases in its preponderance over the drag force and gravity to accelerate the actuation of said control means through the higher engine speed range.

8. The combination, with an internal combustion engine, of means permitting the passage of a fixed minimum flow of fluid, a gravity return valve, means co-acting with said valve for the passage of an additional flow of fluid in progressively increasing volume according to the increasing speed of the engine, means whereby the suction pull created by the aspiratory operation of the engine is applied as a lifting force to said valve and means whereby a vacuum force operates as a drag upon said valve, the said lift initially exceeding the gravity and drag forces in relatively small degree, but progressively increasing beyond that excess with the passage enlarging lift of said valve.

9. The combination, with an internal combustion engine, having a fuel mixture passage, of a nozzle with a central orifice for minimum fuel mixture delivery, a gravity return valve to co-act with said nozzle for the passage of supplemental fuel mixture quotas, said valve operating in a vacuum chamber under the suction pull of the engine, to regulate the delivered quantity of supplemental fuel mixture, and means for varying the degree of the engine suction pull exerted upon said valve in accordance with the R. P. M. rate of the engine, whereby only satisfying fuel mixture charges are permitted to pass to the engine at its different speeds.

10. The combination, with an internal combustion engine, having a fuel mixture passage, of a centered nozzle member in said passage, said nozzle being externally of conoidal form and having an axial orifice, a concentric gravity return valve to co-act with said nozzle member for the passage of fuel mixture between said valve and nozzle member, an annular member to comprise with said valve a vacuum chamber, in which chamber said valve may operate, co-acting portions of said valve and nozzle presenting a slight clearance for the exertion of engine tension at low engine speed to operate said valve, and means whereby said clearance is enlarged as the engine speed mounts to permit the delivery of greater fuel mixture charges.

11. The combination, with an internal combustion engine, having a fuel mixture passage, of a centered nozzle in said passage for the inflow of fuel mixture in minimum volume, a concentric, gravity return valve to co-act with said nozzle at the external diameter thereof, to permit the flow of regulated quantities of fuel mixture, an outwardly inclined circular apron forming part of said valve and having a cylindrical portion, an annulus having a cylindrical portion and an inner, expanding surface continuing therefrom, a vacuum chamber bounded by said valve and annulus, said chamber being in normal communication with the fuel mixture passage, to be subject to the suction pull of the engine through a clearance separating the aforesaid cylindrical portions, which clearance remains constant during the first portion of the valve opening movement, whereby the initial valve movement is relatively sluggish at the lower range of engine speed, and said clearance progressively increasing in area when said cylindrical valve portion has passed the cylindrical portion of said annulus, whereupon the inclined apron of said valve co-acts with the expanding surface of said annulus, in the continued operation of the valve, thus enabling the suction pull of the engine to more rapidly operate the valve for the passage of larger fuel mixture charges, to satisfy the engine in its higher speed range.

12. The combination, with an internal combustion engine, having a fluid passage, of a conoidal member in said passage, and a concentric valve to co-act with said member for the passage of regulated quantities of fluid, said conoidal member having a series of steps to afford dwell places where the fluid volume remains constant in the operation of the valve.

13. Means for varying the volume of fluid mixture supplied to an internal combustion engine, comprising, in combination, a passage-way, fluid control means to constantly maintain a restricted opening through said passage-way, means whereby said fluid control means is variably subject to the aspiratory pull of the engine for its operation in which it permits the volume of passing fluid to increase, and means whereby said fluid control means is directly and variably subject reversely to the aspiratory pull of the engine, to retard its fluid volume increasing operation.

14. Means for varying the volume of fluid mixture supplied to an internal combustion engine, comprising, in combination, a passage-way, fluid control means to constantly maintain a restricted opening through said passage-way, means whereby said fluid control means is variably subject to the aspiratory pull of the engine for its operation in which it permits the volume of passing fluid to increase, means whereby said fluid control means is directly and variably subject reversely to the aspiratory pull of the engine, to retard its fluid volume increasing operation, and means whereby the aspiratory pull of the engine is caused to apply preponderatingly to the volume increasing operation of the control means.

15. Means for varying the volume of fluid mixture supplied to an internal combustion engine, comprising, in combination, a passage-way, fluid control means to vary the opening through said passage-way, means whereby said fluid control means is variably subject to the aspiratory pull of the engine for its operation in which it permits the volume of passing fluid to increase, means whereby said fluid control means is variably subject reversely to the aspiratory pull of the engine, to retard its fluid volume increasing operation, means whereby the aspiratory pull of the engine is caused to apply preponderatingly to the volume increasing operation of the control means, and means whereby the preponderance of aspiratory pull applied to the volume increasing operation of the control means becomes greater at the higher engine speed ranges, to more rapidly increase the volume of fluid passing to the engine as the engine speed then rises at a higher progressive ratio.

16. Means for varying the volume of fluid mixture supplied to an internal combustion engine, comprising, in combination, a passage-way, gravity return fluid control means to vary the opening through said passage-way, means whereby said fluid control means is variably subject to the aspiratory pull of the engine for its operation in which it permits the volume of passing fluid to increase, and means whereby said fluid control means is variably subject reversely to the aspiratory pull of the engine, supplemental to gravity, to retard its fluid volume increasing operation.

17. The combination, with a fluid supply passage for internal combustion engines, of control means in said passage to vary the volume of passing fluid, forward and rearward chambers having different capacities of which said control means forms a part, serving to diminish and increase the respective capacities of said chambers in its operation, means whereby the aspiratory pull of the engine is applied to said forward chamber, to rarify it, and cause the movement of the control means to positions for permitting increased volumes of fluid to pass, and means whereby the aspiratory pull of the engine is applied to the rearward chamber to serve as a drag against the said movement of the control means.

18. The combination with a fluid supply passage for an internal combustion engine, of control means in said passage to vary the volume of passing fluid, forward and rearward chambers subject to the aspiratory action of the engine, and reversely operative to affect the movement of said control means, said chambers being in communication.

19. The combination with a fluid supply passage for an internal combustion engine, of movable control means in said passage to vary the volume of passing fluid, spaced chambers subject to the aspiratory action of the engine and respectively operative to advance and retard said control means, said chambers being in communication whereby the aspiratory action of the engine upon the one affects the other.

20. The combination with a fluid supply passage for an internal combustion engine, of a movable control element in said passage to vary the volume of passing fluid, forward and rearward chambers each partly formed by said control means and subject to the aspiratory action of the engine respectively to create an advancing effect and a retarding effect upon said element, said chambers being in communication with each other.

21. The combination with a fluid supply passage for an internal combustion engine, of a movable control element in said passage to vary the volume of passing fluid, forward and rearward chambers each partly formed by said control element and subject to the aspiratory action of the engine respectively to create an advancing effect and a retarding effect upon said element, said chambers being in communication with each other, and a fixed centered nozzle in said passage co-operating with said element.

Signed at the borough of Manhattan, in the city, county and State of New York, this 6th day of December, 1922.

FRANK POKORNY.